United States Patent
Hua et al.

(10) Patent No.: US 11,144,396 B1
(45) Date of Patent: Oct. 12, 2021

(54) RAID RELIABILITY WITH A PROVISIONAL SPARE DISK

(71) Applicant: EMC IP HOLDING COMPANY LLC, Hopkinton, MA (US)

(72) Inventors: Kuolin Hua, Natick, MA (US); Kunxiu Gao, Boxborough, MA (US); Michael Scharland, Franklin, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/159,282

(22) Filed: Jan. 27, 2021

(51) Int. Cl.
*G06F 11/10* (2006.01)
*G06F 11/20* (2006.01)

(52) U.S. Cl.
CPC ...... *G06F 11/1092* (2013.01); *G06F 11/1088* (2013.01); *G06F 11/1096* (2013.01); *G06F 11/2094* (2013.01)

(58) Field of Classification Search
CPC ............ G06F 11/1088; G06F 11/1092; G06F 11/1096; G06F 11/2094
USPC .................................................. 714/6.2–6.24
See application file for complete search history.

(56) References Cited

U.S. PATENT DOCUMENTS

| | | | | |
|---|---|---|---|---|
| 5,258,984 | A * | 11/1993 | Menon ................ | G06F 11/1076 714/6.32 |
| 5,485,571 | A * | 1/1996 | Menon ................ | G06F 11/1076 714/6.32 |
| 7,111,117 | B2 * | 9/2006 | Franklin .............. | G06F 3/0601 711/114 |
| 7,120,826 | B2 * | 10/2006 | Fore ...................... | G06F 3/0601 714/6.2 |
| 8,020,032 | B2 * | 9/2011 | Abali .................. | G06F 11/2094 714/3 |
| 10,216,578 | B2 * | 2/2019 | Lee ....................... | G06F 3/0616 |
| 2006/0085674 | A1 * | 4/2006 | Ananthamurthy .. | G06F 11/1088 714/6.12 |

* cited by examiner

*Primary Examiner* — Joseph R Kudirka
(74) *Attorney, Agent, or Firm* — Anderson Gorecki LLP

(57) ABSTRACT

Disks of equal storage capacity in a disk cluster have M*W partitions, where RAID width W=D+P. RAID (D+P) protection groups are implemented on the disks with protection group members stored in individual partitions. An amount of storage capacity equal to the storage capacity of one disk is distributed across multiple disks in spare partitions. The spare partitions may be distributed such that no more than one spare partition resides on a single disk. M may be selected to optimize rebuild latency. The protection group members of a failed disk are rebuilt in the distributed spare partitions and subsequently relocated to a provisional spare drive. The populated provisional spare drive replaces the failed drive.

20 Claims, 10 Drawing Sheets

Drive Cluster 310

| disk\part | 1 | 2 | 3 | 4 | 5 | 6 | 7 | 8 | 9 | 10 |
|---|---|---|---|---|---|---|---|---|---|---|
| 1 | 1 | 2 | 3 | 4 | 5 | 6 | 7 | 8 | 9 | 10 |
| 2 | 1 | 2 | 3 | 4 | 5 | 6 | 7 | 8 | 9 | 10 |
| 3 | 1 | 2 | 3 | 4 | 5 | 6 | 7 | 8 | 9 | 10 |
| 4 | 1 | 2 | 3 | 4 | 5 | 6 | 7 | 8 | 9 | 10 |
| 5 | 1 | 2 | 3 | 4 | 5 | 6 | 7 | 8 | 9 | 10 |

Figure 5

Drive Cluster 310 With Distributed Spares

| disk\part | 1 | 2 | 3 | 4 | 5 | 6 | 7 | 8 | 9 | 10 |
|---|---|---|---|---|---|---|---|---|---|---|
| 1 | 1 | 2 | 3 | 4 | 5 | 6 | 7 | 8 | 9 | 10 |
| 2 | 1 | 2 | 3 | 4 |   | 6 | 7 | 8 | 9 |    |
| 3 | 1 | 2 | 3 |   | 5 | 6 | 7 |   | 9 | 10 |
| 4 | 1 | 2 |   | 4 | 5 | 6 | 7 |   | 9 | 10 |
| 5 | 1 |   | 3 | 4 | 5 | 6 |   | 8 | 9 | 10 |
| 6 |   | 2 | 3 | 4 | 5 |   | 7 | 8 | 9 | 10 |

Drive Cluster 320 With Distributed Spares

| diskpart | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| 1 | 1 | 2 | 3 | 4 | 5 | 6 | 7 | 8 | 9 | 10 | 11 | 12 | 13 | 14 | 15 | 16 | 17 | 18 |
| 2 | 1 | 2 | 3 | 4 | 5 | 6 | 7 | 8 | 9 | 10 | 11 | 12 | 13 | 14 | 15 | 16 | 17 | 18 |
| 3 | 1 | 2 |   | 4 | 5 | 6 | 7 |   | 9 | 10 | 11 | 12 | 13 | 14 | 15 | 16 | 17 |   |
| 4 | 1 | 2 | 3 | 4 | 5 | 6 |   | 8 | 9 | 10 | 11 | 12 | 13 | 14 | 15 | 16 |   | 18 |
| 5 | 1 | 2 | 3 | 4 | 5 |   | 7 | 8 | 9 | 10 | 11 | 12 | 13 | 14 | 15 |   | 17 | 18 |
| 6 | 1 | 2 | 3 | 4 |   | 6 | 7 | 8 | 9 | 10 | 11 | 12 | 13 | 14 |   | 16 | 17 | 18 |
| 7 | 1 | 2 | 3 |   | 5 | 6 | 7 | 8 | 9 | 10 | 11 | 12 | 13 |   | 15 | 16 | 17 | 18 |
| 8 | 1 | 2 |   | 4 | 5 | 6 | 7 | 8 | 9 | 10 | 11 |   | 13 | 14 | 15 | 16 | 17 | 18 |
| 9 | 1 |   | 3 | 4 | 5 | 6 | 7 | 8 | 9 |    | 11 | 12 | 13 | 14 | 15 | 16 | 17 | 18 |
| 10 |   | 2 | 3 | 4 | 5 | 6 | 7 | 8 |   | 10 | 11 | 12 | 13 | 14 | 15 | 16 | 17 | 18 |

322 → (empty cell in row 10)
324 → (empty cell in row 9)

Figure 7

Cluster 320

| disk\part | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| 1 | 1 | 2 | 3 | 4 | 5 | 6 | 7 | 8 | 9 | 10 | 11 | 12 | 13 | 14 | 15 | 16 | 17 | 18 |
| 2 | 1 | 2 | 3 | 4 | 5 | 6 | 7 | 8 | 9 | 10 | 11 | 12 | 13 | 14 | 15 | 16 | 17 | 18 |
| 3 | 1 | 2 | 3 | 4 | 5 | 6 | 7 |   | 9 | 10 | 11 | 12 | 13 | 14 | 15 | 16 | A | 18 |
| 4 | 1 | 2 | 3 | 4 | 5 | 6 |   | 8 |   | 10 | 11 | 12 | 13 | 14 | 15 | A | 17 | 18 |
| 5 | 1 | 2 | 3 | 4 | 5 |   | 7 | 8 | 9 | 10 | 11 | 12 | 13 | 14 | A | 16 | 17 | 18 |
| 6 | 1 | 2 | 3 | 4 |   | 6 | 7 | 8 | 9 | 10 | 11 | 12 | 13 | A | 15 | 16 | 17 | 18 |
| 7 | 1 | 2 | 3 |   | 5 | 6 | 7 | 8 | 9 | 10 | 11 | 12 | A | 14 | 15 | 16 | 17 | 18 |
| 8 | 1 | 2 |   | 4 | 5 | 6 | 7 | 8 | 9 | 10 | 11 | A | 13 | 14 | 15 | 16 | 17 | 18 |
| 9 | 1 |   |   | 4 | 5 | 6 | 7 | 8 | 9 | 10 | A | 12 | 13 | 14 | 15 | 16 | 17 | 18 |
| 10 |   | 2 | 3 | 4 | 5 | 6 | 7 | 8 | 9 | A | 11 | 12 | 13 | 14 | 15 | 16 | 17 | 18 |

↑ 322   ↑ 324

Cluster 330

| disk\part | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| 11 | 19 | 20 | 21 | 22 | 23 | 24 | 25 | 26 | 27 | 28 | 29 | 30 | 31 | 32 | 33 | 34 | 35 | 36 |
| 12 | 19 | 20 | 21 | 22 | 23 | 24 | 25 | 26 | 27 | 28 | 29 | 30 | 31 | 32 | 33 | 34 | 35 |   |
| 13 | 19 | 20 | 21 | 22 | 23 | 24 | 25 | 26 | B | 28 | 29 | 30 | 31 | 32 | 33 | 34 |   | 36 |
| 14 | 19 | 20 | 21 | 22 | 23 | 24 | 25 | B | 27 | 28 | 29 | 30 | 31 | 32 | 33 |   | 35 | 36 |
| 15 | 19 | 20 | 21 | 22 | 23 | 24 | B | 26 | 27 | 28 | 29 | 30 | 31 | 32 |   | 34 | 35 | 36 |
| 16 | 19 | 20 | 21 | 22 | 23 | B | 25 | 26 | 27 | 28 | 29 | 30 | 31 |   | 33 | 34 | 35 | 36 |
| 17 | 19 | 20 | 21 | 22 | B | 24 | 25 | 26 | 27 | 28 | 29 | 30 |   | 32 | 33 | 34 | 35 | 36 |
| 18 | 19 | 20 | 21 | B | 23 | 24 | 25 | 26 | 27 | 28 | 29 |   | 31 | 32 | 33 | 34 | 35 | 36 |
| 19 | 19 | 20 | B | 22 | 23 | 24 | 25 | 26 | 27 | 28 |   | 30 | 31 | 32 | 33 | 34 | 35 | 36 |
| 20 | B | 20 | 21 | 22 | 23 | 24 | 25 | 26 | 27 |   | 29 | 30 | 31 | 32 | 33 | 34 | 35 | 36 |

RAID RELIABILITY WITH A PROVISIONAL SPARE DISK

TECHNICAL FIELD

The subject matter of this disclosure is generally related to electronic data storage, and more particularly to rebuilding protection group members.

BACKGROUND

The disk drives of a mass storage system are usually organized as members of protection groups known as redundant arrays of independent disks (RAID). RAID helps to avoid data loss by enabling reconstruction of a protection group member in the event of disk failure. A RAID (D+P) protection group has D data members and P parity members. The data members are used to store data. The parity members are used to store parity information such as XORs of data values from the data members. The parity information enables reconstruction of the data values in the event that a data member fails. Parity information can be reconstructed from the data values on the data members in the event that a parity member fails. A failed disk that is a member of a RAID protection group can be rebuilt directly on a spare disk using the remaining non-failed disks of the protection group. However, data loss can occur in a protection group for which two members are in a failed state at the same time so a race condition exists between rebuilding the failed disk and occurrence of a second disk failure associated with the protection group. Moreover, even after the rebuild is complete a second disk failure can result in data loss if a second spare disk is not in a standby state and ready to be automatically placed into service.

SUMMARY

In accordance with some aspects an apparatus comprises: a storage array comprising: at least one compute node comprising at least one processor and non-transitory computer-readable memory; a plurality of data storage disks that are accessed by the at least one compute node and used to store data that is accessed via the at least one compute node, each of the data storage disks being associated with one disk cluster that contains RAID (D+P) protection groups where RAID width W=D+P and each disk has M*W indexed partitions of equal storage capacity; a provisional spare disk; and a disk manager configured to: distribute spare partitions across a plurality of the disk clusters; and responsive to detection of a failed one of the data storage disks: rebuild protection group members of the failed data storage disk on the distributed spare partitions; and relocate rebuilt protection group members from the distributed spare partitions to the provisional spare disk.

In accordance with some aspects a method is implemented by a storage array comprising at least one compute node comprising at least one processor and non-transitory computer-readable memory and a plurality of data storage disks that are accessed by the at least one compute node and used to store data that is accessed via the at least one compute node, each of the data storage disks being associated with one disk cluster that contains RAID (D+P) protection groups where RAID width W=D+P and each disk has M*W indexed partitions of equal storage capacity, the method comprising: distributing spare partitions across a plurality of the disk clusters; and responsive to detection of a failed one of the data storage disks: rebuilding protection group members of the failed data storage disk on the distributed spare partitions; and relocating rebuilt protection group members from the distributed spare partitions to the provisional spare disk.

In accordance with some aspects a computer-readable storage medium stores instructions that when executed by a storage array comprising at least one compute node comprising at least one processor and non-transitory computer-readable memory and a plurality of data storage disks that are accessed by the at least one compute node and used to store data that is accessed via the at least one compute node, each of the data storage disks being associated with one disk cluster that contains RAID (D+P) protection groups where RAID width W=D+P and each disk has M*W indexed partitions of equal storage capacity, cause the compute node to perform a method for recovering from disk failure, the method comprising: distributing spare partitions across a plurality of the disk clusters; and responsive to detection of a failed one of the data storage disks: rebuilding protection group members of the failed data storage disk on the distributed spare partitions; and relocating rebuilt protection group members from the distributed spare partitions to the provisional spare disk.

All examples, aspects, implementations, and features mentioned in this disclosure can be combined in any technically possible way. Other aspects, features, and implementations may become apparent in view of the detailed description and figures.

BRIEF DESCRIPTION OF THE FIGURES

FIGS. 5 and 6 illustrate creation of distributed spare partitions with a drive cluster that implements RAID-5 (4+1) and includes 10 partitions per drive, i.e. (M=2*W).

FIG. 7 illustrates a RAID-5 (8+1) cluster with distributed spare partitions.

FIG. 8 illustrates further distribution of diagonally oriented groups of spare partitions on two RAID-5 (8+1) clusters.

FIG. 9 illustrates use of the two RAID-5 (8+1) clusters with distributed spare partitions to rebuild members of a failed disk.

FIG. 10 illustrates relocation of the rebuilt members from the two RAID-5 (8+1) clusters to the provisional spare drive and replacement of the failed drive by the provisional spare drive.

DETAILED DESCRIPTION

The terminology used in this disclosure is intended to be interpreted broadly within the limits of subject matter eligibility. The terms "disk" and "drive" are used interchangeably to refer to non-volatile storage media but are not intended to refer to any specific type of non-volatile storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
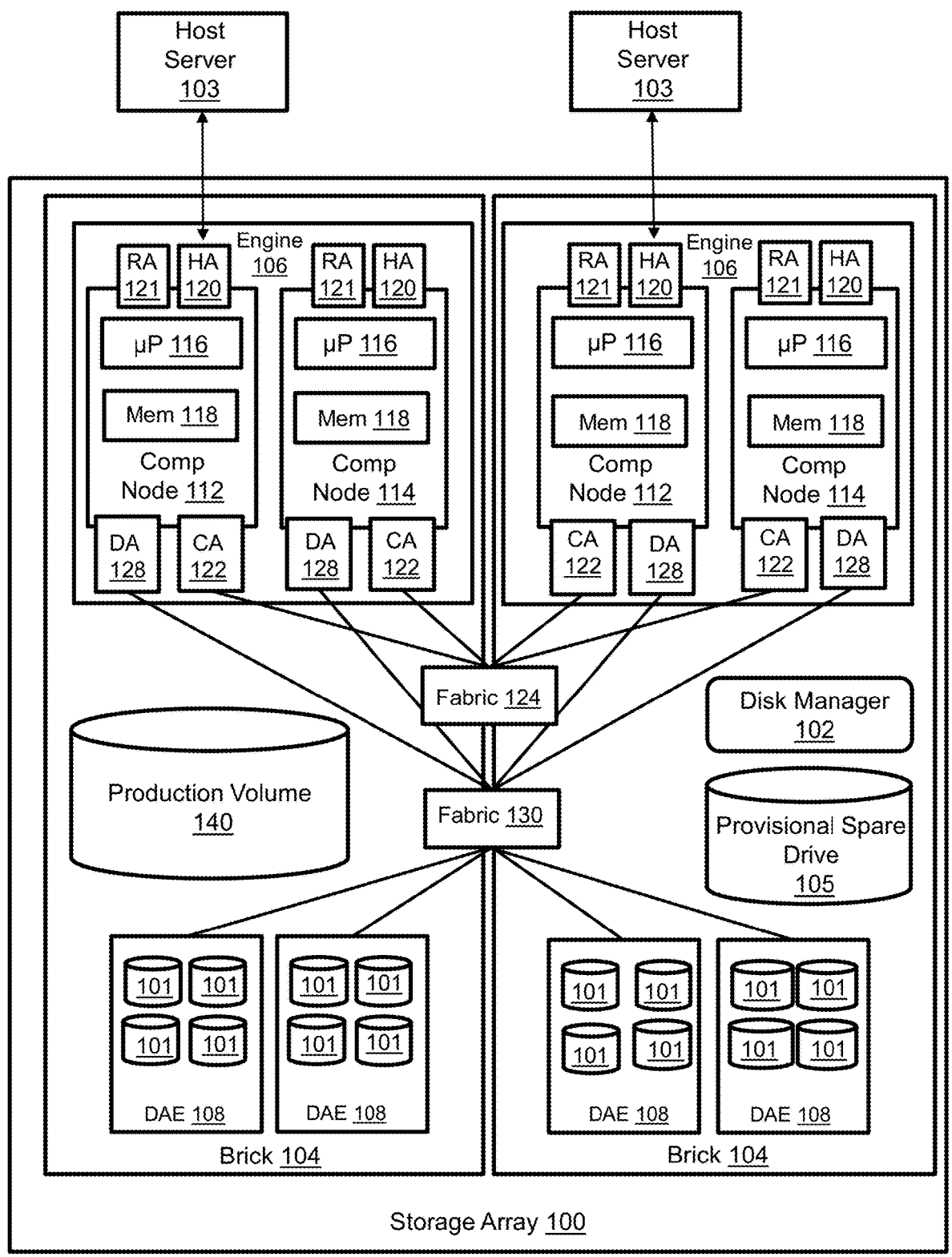
FIG. 1 illustrates a storage array with a disk manager that uses distributed spare partitions and a provisional spare drive to recover from drive failures.

FIG. 1 illustrates a storage array 100 with a disk manager 102 that uses distributed spare partitions on managed drives 101 and a provisional spare drive 105 to recover from drive failure. The storage array is one example of a storage area network (SAN), which is one example of a data storage system in which the disk manager could be implemented. The storage array 100 is depicted in a simplified data center environment supporting two host servers 103 that run host applications. The storage array would typically support more than two host servers. The host servers 103 include volatile memory, non-volatile storage, and one or more tangible processors. The storage array 100 includes one or more bricks 104. Each brick includes an engine 106 and one or more disk array enclosures (DAEs) 108. Each engine 106 includes a pair of interconnected compute nodes 112, 114 that are arranged in a failover relationship and may be referred to as "storage directors." Although it is known in the art to refer to the compute nodes of a SAN as "hosts," that naming convention is avoided in this disclosure to help distinguish the network server hosts 103 from the compute nodes 112, 114. Nevertheless, the host applications could run on the compute nodes, e.g., on virtual machines or in containers. Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with the host servers 103. Each host adapter has resources for servicing input-output commands (IOs) from the host servers. The host adapter resources may include processors, volatile memory, and ports via which the hosts may access the storage array. Each compute node also includes a remote adapter (RA) 121 for communicating with other storage systems, e.g., for remote mirroring, backup, and replication. Each compute node also includes one or more disk adapters (DAs) 128 for communicating with managed disks 101 in the DAEs 108. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed disks 101 include non-volatile storage media such as, without limitation, solid-state disks (SSDs) based on EEPROM technology such as NAND and NOR flash memory and hard disk disks (HDDs) with spinning disk magnetic storage media. Disk controllers may be associated with the managed disks as is known in the art. An interconnecting fabric 130 enables implementation of an N-way active-active backend. A backend connection group includes all disk adapters that can access the same disk or disks. In some implementations every disk adapter 128 in the storage array can reach every DAE via the fabric 130. Further, in some implementations every disk adapter in the storage array can access every managed disk 101.

Data associated with instances of the hosted applications running on the host servers 103 is maintained on the managed disks 101. The managed disks 101 are not discoverable by the host servers but the storage array creates a logical storage device known as a production volume 140 that can be discovered and accessed by the host servers. Without limitation, the logical storage device may be referred to as a storage object, source device, production volume, production device, or production LUN, where the logical unit number (LUN) is a number used to identify logical storage volumes in accordance with the small computer system interface (SCSI) protocol. From the perspective of the host servers 103, the production volume 140 is a single disk having a set of contiguous fixed-size logical block addresses (LBAs) on which data used by the instances of the host application resides. However, the host application data is stored at non-contiguous addresses on various managed disks 101. The compute nodes maintain metadata that maps between the production volume 140 and the managed disks 101 in order to process IOs from the hosts.

Figure 2:
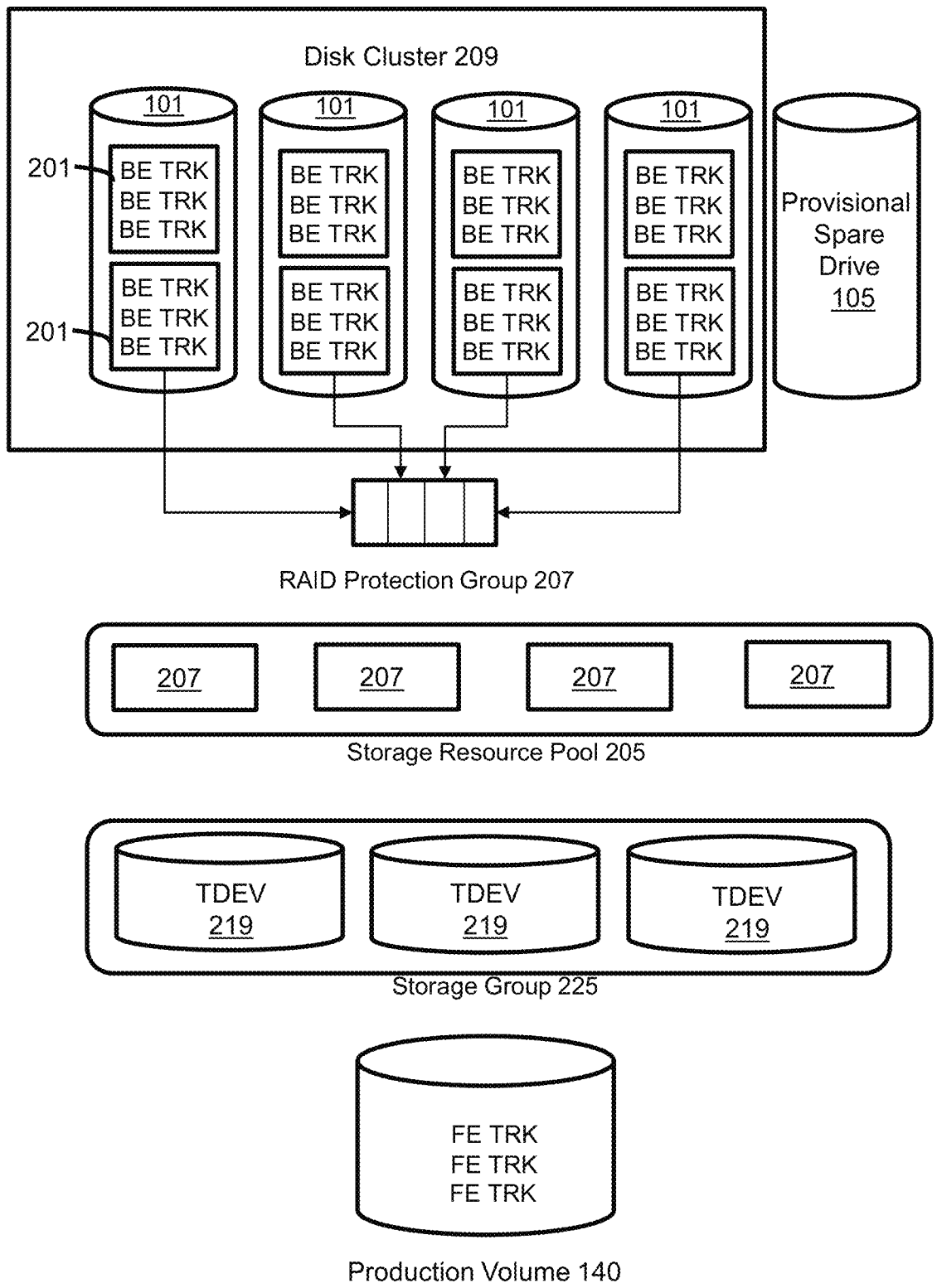
FIG. 2 illustrates layers of abstraction between the managed disks and the production volume.

FIG. 2 illustrates layers of abstraction between the managed disks 101 and the production volume 140. The basic allocation unit of storage capacity that is used by the compute nodes to access the managed disks 101 is a backend track (BE TRK). BE TRKs all have the same fixed size which may be an integer (greater than 1) multiple of the managed disk sector size. The managed disks 101 are each divided into capacity groupings known as "partitions," "slices," or "splits" 201 of equal storage capacity. Each partition 201 is large enough to accommodate multiple BE TRKs. Selection of partition storage capacity is a design implementation and, for context and without limitation, may be some fraction or percentage of the capacity of a managed disk equal to an integer multiple of the sector size. Each partition may include a contiguous range of logical addresses. Groups of managed disks are organized into a disk cluster 209. Partitions from different managed disks of a single disk cluster 209 are used to create a RAID protection group 207. Each partition in a protection group 207 must be on a different managed disk in order to be RAID compliant protection group members. All managed disks within the cluster 209 have the same storage capacity. A storage resource pool 205 is a collection of RAID protection groups 207 of the same type, e.g., RAID-5 (3+1) or RAID-5 (8+1). Logical thin devices (TDEVs) 219 are created from a storage resource pool and organized into a storage group 225. The production volume 140 is created from one or more storage groups. Host application data is stored in front-end tracks (FE TRKs), that may be referred to as "blocks," on the production volume 140. The FE TRKs on the production volume 140 are mapped to BE TRKs on the managed disks 101 by metadata. The storage array may create and maintain multiple production volumes, storage groups, storage resource pools, protection groups, and disk clusters.

RAID rebuild latency is a function of disk write latency. Rebuilding a failed managed drive directly on a spare drive as is done in accordance with standard practices in the art is problematic in terms of latency because all writes associated with rebuilding are made to a single drive. One aspect of reducing RAID rebuild latency is distributing spare capacity across multiple drives so that the writes associated with rebuilding protection groups in response to drive failure are parallelized. As will be described below, spare partitions with aggregate storage capacity equal to one managed drive may be distributed on multiple disks in a drive cluster to reduce RAID rebuild latency. In some implementations spare partitions may be distributed on multiple disks of multiple drive clusters and the number of partitions per disk may be selected to optimize rebuilding. Further, rebuilt protection group members may be relocated from distributed spare partitions to the provisional spare drive to facilitate replacement of the failed drive.

In FIGS. 3 through 10, drive clusters with RAID (D+P) protections groups with D data members and P parity members are represented by matrices with rows of sequentially numbered disks and columns of sequentially numbered partitions. Numbered entries in the matrices represent numbered protection groups and blank entries represent spare partitions. RAID width W=D+P. Each disk is subdivided into M partitions, where M is an integer multiple of W. Every RAID group has W members distributed on W different disks.

Figure 3:
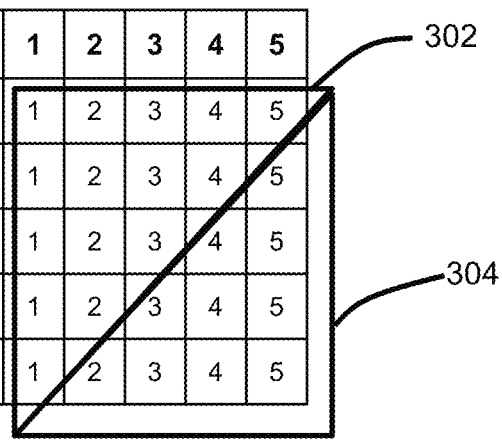
FIGS. 3 and 4 illustrate creation of distributed spare partitions in a cluster in which M=W.
Figure 4:
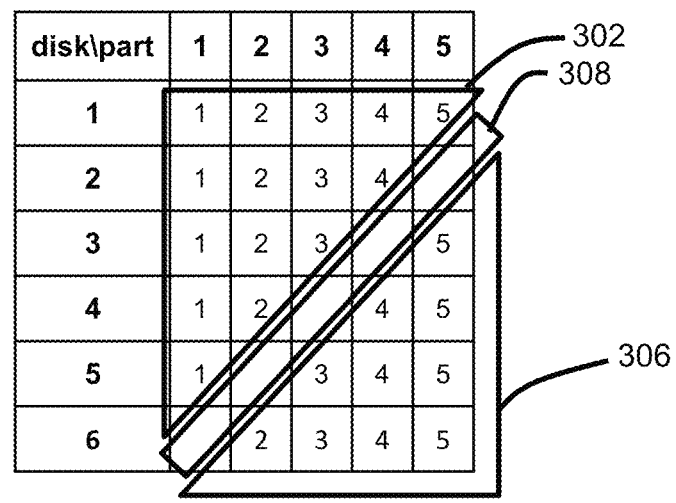

FIGS. 3 and 4 illustrate creation of distributed spare partitions in a drive cluster 300 in which M=W. The drive cluster initially includes a conceptual upper-left triangle 302 and lower-right triangle 304. After n new drives are added to the drive cluster, protection group members from the lower-right triangle 304 are moved to the new drives, thereby creating free partitions for n new diagonally oriented protection groups or distributed spare partitions. In the illustrated example n=1 for ease of explanation. The scaled-up cluster 300 with spares includes conceptual matrices with three parts per matrix: the upper-left triangle 302, a lower-right triangle 306 and a diagonal grouping 308 of spare partitions equal in number to the RAID width W. In other words, the distributed spare partitions have an aggregate storage capacity equal to the storage capacity of one disk. The upper-left triangle 302 does not move during cluster growth. Each protection group member in the lower-right triangle moves only once, rather than multiple times, e.g., if drives are added one by one.

FIGS. 5 and 6 illustrate creation of distributed spare partitions with a drive cluster that implements RAID-5 (4+1) and includes 10 partitions per drive, i.e., M=2*W. Each protection group is created using 5 partitions that are distributed across 5 drives. There are 10 RAID protection groups in total. In each protection group the respective members are vertically oriented in the columns such that the protection group number matches the partition index. When a new drive, shown as drive number 6, is added to the cluster then 8 partitions selected from protection groups 2-5 and protection groups 7-10 on drives 2-5 are redistributed to the new drive. The partitions are selected from consecutively numbered drives and split indices such that two parallel, diagonally oriented groups of partitions 312, 314 are freed as specifically shown in FIG. 6. The first and sixth partitions on the new drive are reserved and two partitions per drive of each of all but one of the original drives are redistributed. None of the members of protection group 1 are redistributed and none of the members of protection group 6 are redistributed. The two parallel, diagonally oriented groups of partitions 312, 314 are designated as spare partitions. Rebuilding protection group members of a failed drive on the spare partitions reduces latency relative to directly rebuilding the protection group members on a spare drive because the writes are distributed across 5 disks rather than all being made to a single disk.

FIG. 7 illustrates a RAID-5 (8+1) cluster 320 with distributed spare partitions. M=2*W and 18 RAID groups are organized into 2 submatrices associated respectively with partitions 1-9 and partitions 10-18 with the distribution pattern described above, e.g., group member number matches partition index and there are two parallel, diagonally oriented groups of spare partitions 322, 324. Each submatrix has W+1 rows by W columns and there is one diagonally oriented group of spare partitions per submatrix for which each spare on each diagonal is located on a different disk. Although rebuilding protection group members of a failed drive on the parallel groups of spare partitions reduces latency relative to directly rebuilding the protection group members on a spare drive, rebuild latency can be further reduced by reducing the number of spare partitions per drive by further distribution of spare partitions as will be described below.

FIG. 8 illustrates further distribution of diagonally oriented groups of spare partitions on two RAID-5 (8+1) clusters. Previously described cluster 320 and another RAID-5 (8+1) cluster 330 are each created with two parallel, diagonally oriented groups of spare partitions 322, 324 and 326, 328, respectively. In order to match the aggregate capacity of the spare partitions to the capacity of a single managed disk, two new protection groups A, B are created using one of the diagonally oriented groups of spare partitions of each cluster using non-overlapping partition indices. In the illustrated example new RAID group A is created in diagonally oriented group of partitions 324 and new RAID group B is created in diagonally oriented group of partitions 326. The remaining M spare partitions are distributed across M different disks in different clusters. It should be noted that such further distribution can be implemented by creating two clusters with diagonally oriented groups of spare partitions or growing and splitting a single cluster with diagonally oriented groups of spare partitions.

In the implementation shown in FIG. 8 the RAID rebuild workload is evenly spread over twice as many disks as in a single cluster with parallel sets of spare partitions as shown in FIG. 7. With finer granularity partitions and more clusters, the RAID rebuild workload may be further distributed such that failure recovery time may be further reduced. More specifically, the parameter M (partitions per disk) may be selected to optimize successive redistribution of spares. For example, a RAID 5 (8+1) system may have M=36 partitions per disk, rather than 18, with spares optimally distributed over 4 clusters, where each cluster contributes ¼ of the distributed spare capacity.

Figure 9:
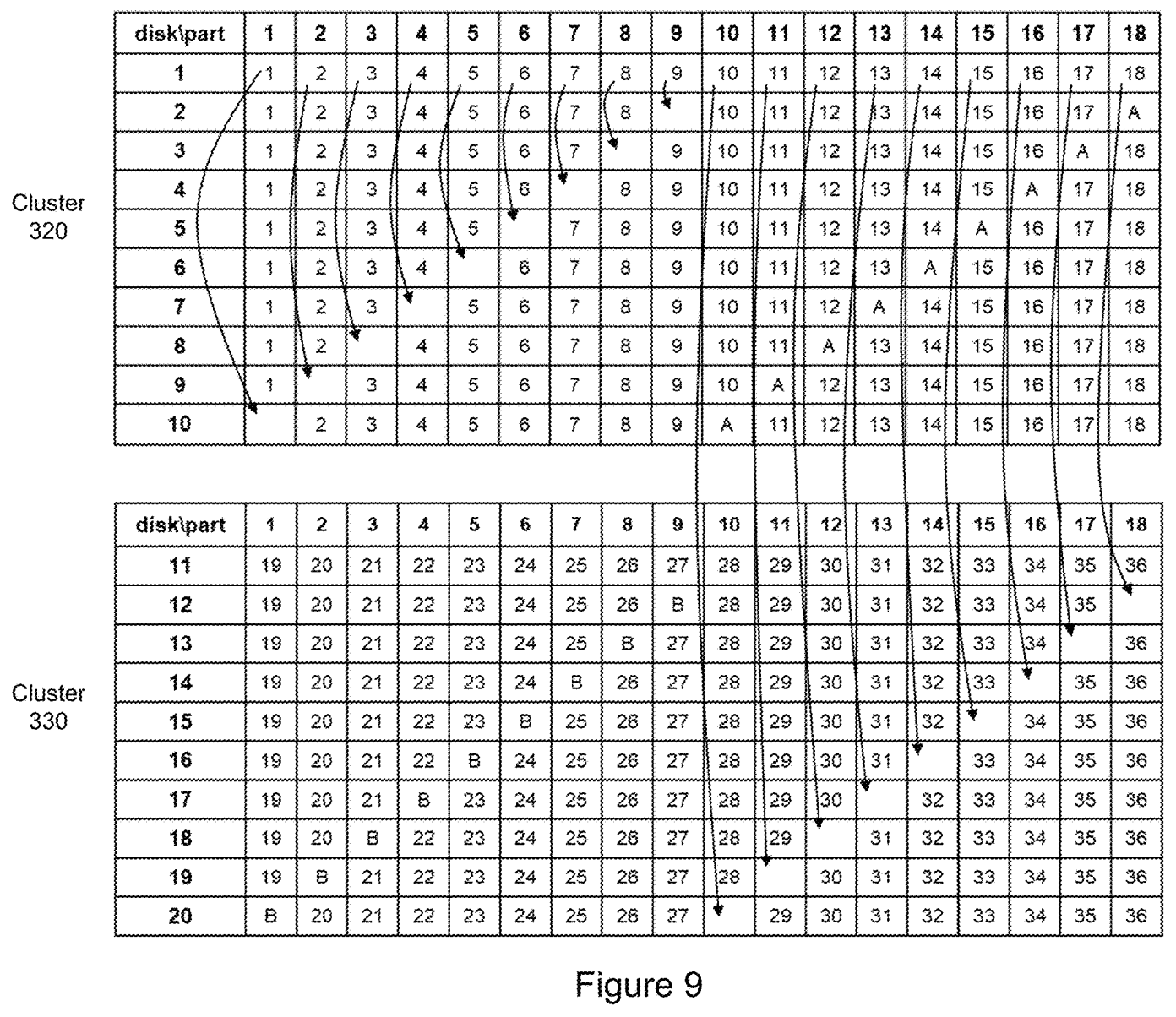

FIG. 9 illustrates use of the two RAID-5 (8+1) clusters 320, 330 with distributed spare partitions to rebuild members of a failed disk. In the illustrated example drive 1 of cluster 320 fails. The RAID protection group members of drive 1 are rebuilt on the distributed spare partitions as shown. Specifically, the RAID protection group members of drive 1 are rebuilt on the distributed spare partitions having matching partition indices, e.g., disk 1, partition 1 is rebuilt on disk 10, partition 1 and, similarly, disk 1, partition 10 is rebuilt on disk 20, partition 10.

Figure 10:
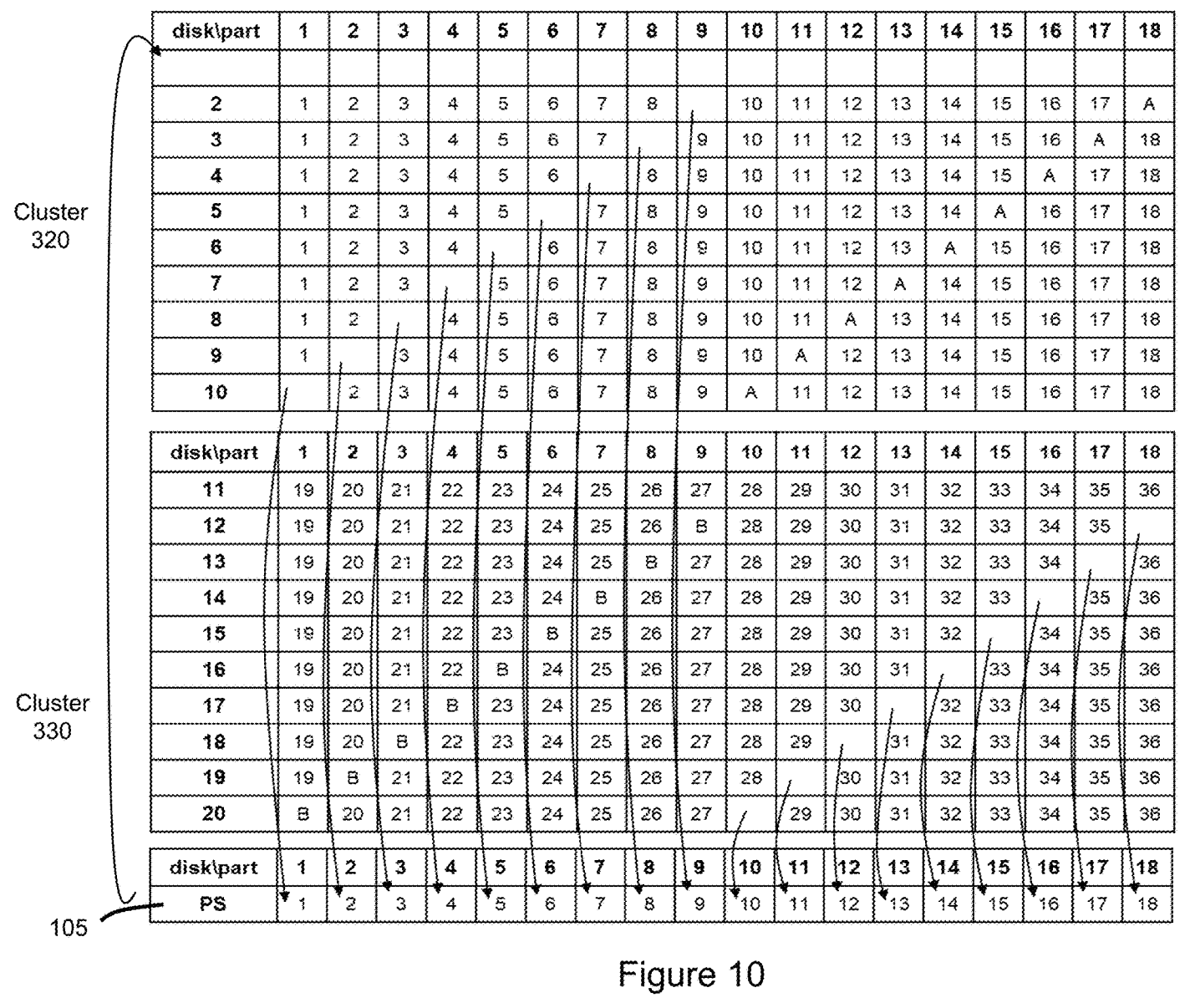

FIG. 10 illustrates relocation of the rebuilt members from the distributed spare partitions of the two RAID-5 (8+1) clusters 320, 330 to the provisional spare drive 105 and replacement of the failed drive (drive 1) by the provisional spare drive 105. The RAID protection group members are moved from the distributed spare partitions on which they were directly rebuilt to partitions of the provisional spare drive 105 having matching partition indices, e.g., member 1 at disk 10, partition 1 is rebuilt on partition 1 of the provisional spare drive and, similarly, member 10 at disk 20, partition 1 is rebuilt on partition 10 of the provisional spare drive. Moving the rebuilt protection group members from the distributed spare partitions to the provisional spare drive restores the availability of the spare partitions to be used in the event of another disk failure. The populated provisional spare drive is then redesignated with the ID of the failed drive, e.g., drive 1, and incorporated into drive cluster 320. A new empty drive (replacement disk) with M partitions is installed as a replacement for the provisional spare drive, thereby restoring enough capacity for protection against two disk failures.

Figure 11:
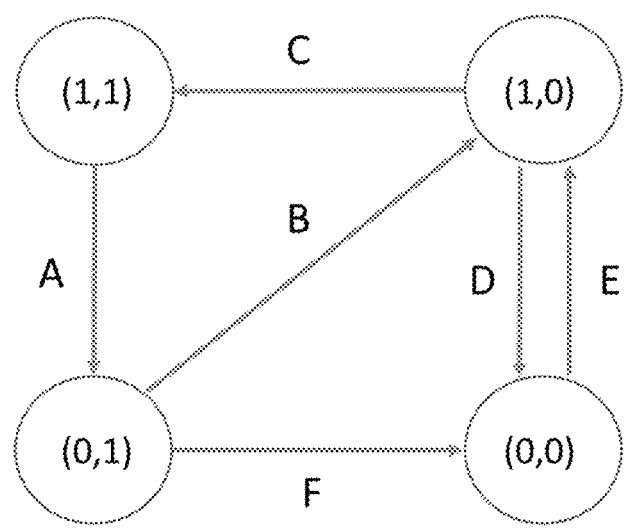
FIG. 11 is a state diagram of the use of distributed spare partitions and a provisional spare drive to recover from drive failure.

FIG. 11 is a state diagram of the use of distributed spare partitions and a provisional spare drive to recover from drive failures. Each state is denoted by a tuple of Boolean numbers (0 or 1), where the first number indicates the availability of distributed spares and the second number indicates the availability of the provisional spare disk. The four states are as follows:

(1, 1): Normal state;
(0, 1): Temporary state immediately after RAID rebuild;
(1, 0): The state after the content of the failed disk is restored to the provisional spare disk, while waiting for the replacement disk;
(0, 0): The state after 2 disk failures, while waiting for the replacement disks.

The state transition events are as follows:
A: A single disk failure triggers RAID rebuild using the distributed spare partitions;
B: The distributed spare partitions are again available after restoring the content of the failed disk to the provisional spare disk;
C: A replacement disk arrives and becomes the provisional spare disk;
D: The second disk failure triggers RAID rebuild using the distributed spare partitions;
E: A replacement disk arrives, and the distributed spare partitions are freed;
F: The second disk failure is recovered using the provisional spare disk.

If the storage array grows to a point where the spares are optimally distributed for the fastest failure recovery of a single disk failure, additional new clusters may be used to supply distributed spare partitions for recovery of a second disk failure. In such a case the provisional spare disk may be converted to a regular disk with spare partitions and data partitions. For example, the optimal spares distribution of a RAID 5 (8+1) system (RAID width W=9) with M=36 partitions per disk may require 4 clusters. The provisional spare disk can be converted to a regular disk when capacity is grown to 5 or more clusters, with the second set of distributed spare partitions used for protection against the second disk failure. The total amount of spare capacity will not change, though, since the equivalent spare capacity of the provisional spare disk becomes distributed as spare partitions over multiple disks.

Figure 12:
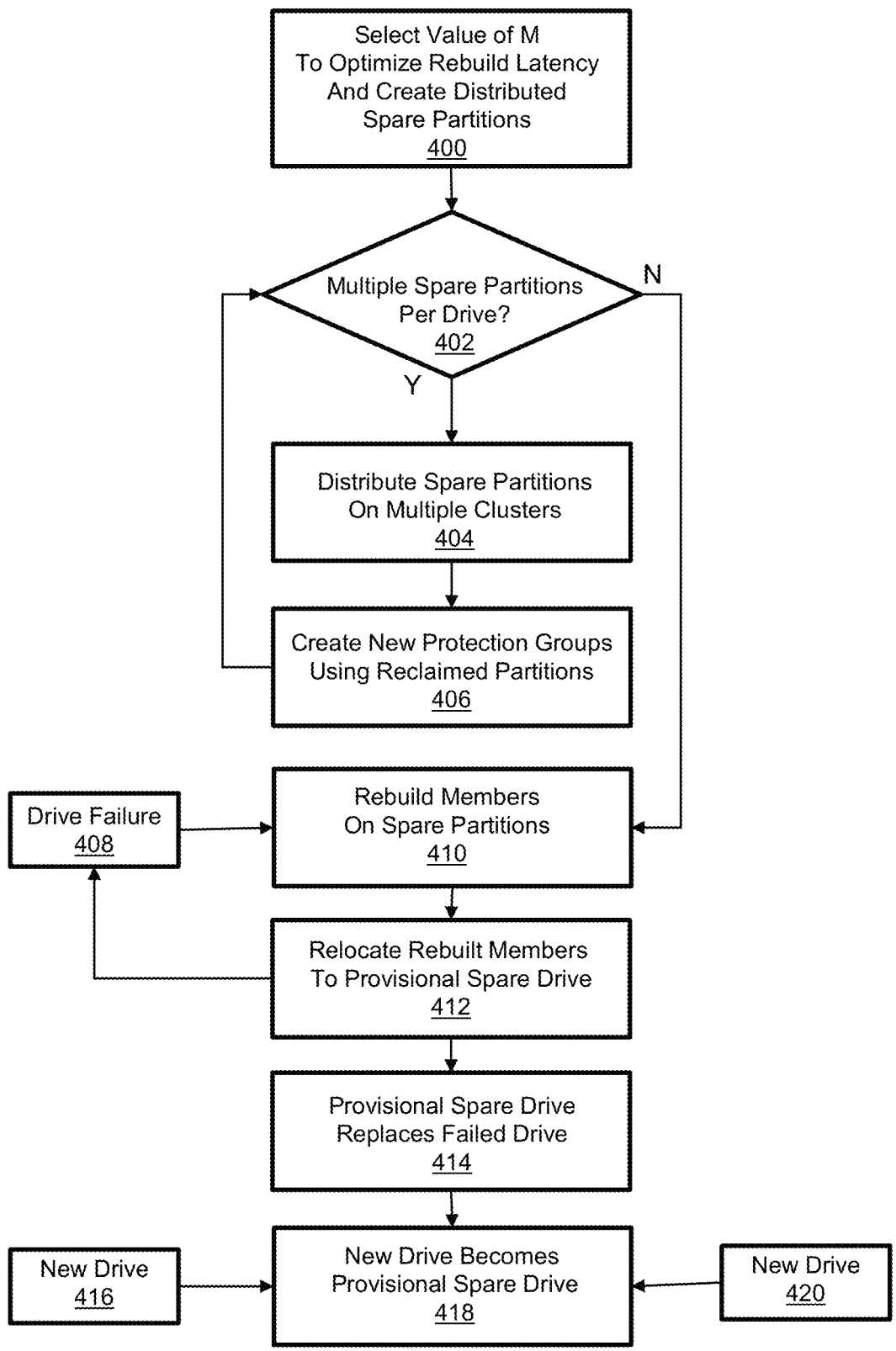
FIG. 12 illustrates steps associated with use of distributed spare partitions and a provisional spare drive to recover from drive failure.

FIG. 12 illustrates steps associated with use of distributed spare partitions and a provisional spare drive to recover from drive failure. Step 400 is selecting a value of M to optimize rebuild latency and creating distributed spare partitions. If there are multiple distributed spare partitions per drive as determined at step 402 then the spare partitions are further distributed on multiple drive clusters as indicated at step 404. New protection groups are created using partitions that can be reclaimed due to further distribution of spares, as indicated at step 406. Steps 404 and 406 are iterated until no disks contain multiple spare partitions. Total distributed spare capacity may equal one or multiple disks depending on design choice.

Responsive to a drive failure 408, protection group members of the failed drive are rebuilt on the distributed spare partitions as indicated in step 410. Subsequently, the rebuilt protection group members are relocated from the distributed spare partitions to the provisional spare drive as indicated in step 412. Step 414 is replacing the failed drive with the populated provisional spare drive. When a new (replacement) drive 416 is installed the new drive becomes a replacement provisional spare drive as indicated in step 418.

In the case in which a second drive failure 408 occurs after step 412 and before step 414 the protection group members of the second failed drive are rebuilt on the distributed spare partitions as indicated in step 410. The distributed spare partitions become available as a result of step 412. Subsequently, the rebuilt protection group members of the second failed drive are relocated from the distributed spare partitions to the replacement provisional spare drive. A second new (replacement) drive 420 becomes the second replacement provisional spare drive.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus, comprising:
a storage array comprising:
at least one compute node comprising at least one processor and non-transitory computer-readable memory;
a plurality of data storage disks that are accessed by the at least one compute node and used to store data that is accessed via the at least one compute node, each of the data storage disks being associated with one disk cluster that contains Redundant Array of Independent Disks (RAID) (D+P) protection groups where RAID width W=D+P and each disk has M*W indexed partitions of equal storage capacity and each member of ones of the RAID protection groups is located on one of the partitions on a different one of the plurality of data storage disks;
a provisional spare disk that is present in the storage array prior to failure of one of the data storage disks of the disk cluster; and
a disk manager configured to:
distribute spare partitions across a plurality of the disk clusters; and
responsive to detection of a failed one of the data storage disks:
rebuild protection group members of the failed data storage disk on the distributed spare partitions such that each rebuilt member of ones of the RAID protection groups of the failed data storage disk is located on one of the partitions on a different one of the plurality of data storage disks; and
relocate rebuilt protection group members from the distributed spare partitions to the provisional spare disk.

2. The apparatus of claim 1 wherein the disk manager is configured to replace the failed data storage disk with the provisional spare disk having the rebuilt protection group members stored thereon.

3. The apparatus of claim 1 wherein the disk manager is configured to select a value of M to optimize latency of rebuild of protection group members of the failed data storage disk on the distributed spare partitions.

4. The apparatus of claim 1 wherein the disk manager is configured to distribute spare partitions across the plurality of the disk clusters until none of the data storage disks includes more than one distributed spare partition.

5. The apparatus of claim 4 wherein the disk manager is configured to reclaim partitions freed as a result of distribution of spare partitions.

6. The apparatus of claim 5 wherein the disk manager is configured to create a new RAID (D+P) protection group using the reclaimed partitions.

7. The apparatus of claim 1 wherein the disk manager is configured to rebuild protection group members of a second failed data storage disk on the distributed spare partitions after the rebuilt protection group members are relocated from the distributed spare partitions to the provisional spare disk.

8. A method implemented by a storage array comprising at least one compute node comprising at least one processor and non-transitory computer-readable memory and a plurality of data storage disks that are accessed by the at least one compute node and used to store data that is accessed via the at least one compute node, each of the data storage disks being associated with one disk cluster that contains Redundant Array of Independent Disks (RAID) (D+P) protection groups where RAID width W=D+P and each disk has M*W indexed partitions of equal storage capacity and each member of ones of the RAID protection groups is located on one of the partitions on a different one of the plurality of data storage disks, the method comprising:
distributing spare partitions across a plurality of the disk clusters; and
responsive to detection of a failed one of the data storage disks:
rebuilding protection group members of the failed data storage disk on the distributed spare partitions; and
relocating rebuilt protection group members from the distributed spare partitions to the provisional spare disk, wherein the provisional spare disk is present in the storage array prior to detection of the failed one of the data storage disks.

9. The method of claim 8 comprising replacing the failed data storage disk with the provisional spare disk having the rebuilt protection group members stored thereon.

10. The method of claim 8 comprising selecting a value of M to optimize latency of rebuild of protection group members of the failed data storage disk on the distributed spare partitions.

11. The method of claim 8 comprising distributing spare partitions across the plurality of the disk clusters until none of the data storage disks includes more than Off one distributed spare partition.

12. The method of claim 11 comprising reclaiming partitions freed as a result of distribution of spare partitions.

13. The method of claim 12 comprising creating a new RAID (D+P) protection group using the reclaimed partitions.

14. The method of claim 8 comprising rebuilding protection group members of a second failed data storage disk on the distributed spare partitions after the rebuilt protection group members are relocated from the distributed spare partitions to the provisional spare disk.

15. A non-transitory computer-readable storage medium storing instructions that when executed by a storage array comprising at least one compute node comprising at least one processor and non-transitory computer-readable memory and a plurality of data storage disks that are accessed by the at least one compute node and used to store data that is accessed via the at least one compute node, each of the data storage disks being associated with one disk cluster that contains Redundant Array of Independent Disks (RAID) RAID (D+P) protection groups where RAID width W=D+P and each disk has M*W indexed partitions of equal storage capacity and each member of ones of the RAID protection groups is located on one of the partitions on a different one of the plurality of data storage disks, cause the storage array to perform a method for recovering from disk failure, the method comprising:
distributing spare partitions across a plurality of the disk clusters; and
responsive to detection of a failed one of the data storage disks:
rebuilding protection group members of the failed data storage disk on the distributed spare partitions; and
relocating rebuilt protection group members from the distributed spare partitions to the provisional spare disk, wherein the provisional spare disk is present in the storage array prior to detection of the failed one of the data storage disks.

16. The non-transitory computer-readable storage medium of claim 15 wherein the method further comprises replacing the failed data storage disk with the provisional spare disk having the rebuilt protection group members stored thereon.

17. The non-transitory computer-readable storage medium of claim 15 wherein the method further comprises selecting a value of M to optimize latency of rebuild of protection group members of the failed data storage disk on the distributed spare partitions.

18. The non-transitory computer-readable storage medium of claim 15 wherein the method further comprises distributing spare partitions across the plurality of the disk clusters until none of the data storage disks includes more than one distributed spare partition.

19. The non-transitory computer-readable storage medium of claim 18 wherein the method further comprises reclaiming partitions freed as a result of distribution of spare partitions.

20. The non-transitory computer-readable storage medium of claim 19 wherein the method further comprises creating a new RAID (D+P) protection group using the reclaimed partitions.

* * * * *